United States Patent
Sano et al.

(10) Patent No.: US 9,523,827 B2
(45) Date of Patent: Dec. 20, 2016

(54) OPTICAL-ELECTRICAL COMPOSITE CONNECTOR

(71) Applicant: Hirose Electric Co., Ltd., Tokyo (JP)

(72) Inventors: Yoshiaki Sano, Tokyo (JP); Akira Funatsu, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 205 days.

(21) Appl. No.: 14/463,731

(22) Filed: Aug. 20, 2014

(65) Prior Publication Data

US 2015/0063763 A1    Mar. 5, 2015

(30) Foreign Application Priority Data

Aug. 29, 2013 (JP) .................................. 2013-177666

(51) Int. Cl.
*G02B 6/42* (2006.01)
*G02B 6/38* (2006.01)

(52) U.S. Cl.
CPC ........... *G02B 6/4256* (2013.01); *G02B 6/3823* (2013.01); *G02B 6/4284* (2013.01); *G02B 6/4293* (2013.01); *G02B 6/4257* (2013.01); *G02B 6/4285* (2013.01)

(58) Field of Classification Search
CPC ... G02B 6/4256; G02B 6/4257; G02B 6/4284; G02B 6/4293
See application file for complete search history.

(56) References Cited

U.S. PATENT DOCUMENTS

| | | | | |
|---|---|---|---|---|
| 5,956,449 A * | 9/1999 | Otani | .................. | G02B 6/4454 385/134 |
| 6,709,168 B2 * | 3/2004 | Imabayashi | .......... | G02B 6/4453 385/134 |
| 7,393,147 B1 * | 7/2008 | Rollinger | ............. | G02B 6/4201 385/92 |
| 8,021,057 B2 * | 9/2011 | Tamura | ................ | G02B 6/4292 385/75 |
| 9,052,477 B2 * | 6/2015 | Oki | ...................... | G02B 6/4201 |
| 9,261,663 B2 * | 2/2016 | Loeffelholz | .......... | G02B 6/4453 |
| 2009/0074370 A1 * | 3/2009 | Kowalczyk | .......... | G02B 6/4441 385/135 |
| 2011/0211798 A1 | 9/2011 | Chen | | |

FOREIGN PATENT DOCUMENTS

| | | |
|---|---|---|
| JP | 2006030868 A | 2/2006 |
| JP | 2009-198603 A | 9/2009 |
| JP | 2012-088571 A | 5/2012 |
| JP | 2013101408 A | 5/2013 |
| WO | 2013052748 A2 | 4/2013 |

* cited by examiner

*Primary Examiner* — Daniel Petkovsek
(74) *Attorney, Agent, or Firm* — Kubotera & Associates, LLC (57) ABSTRACT

An optical-electrical composite connector includes a housing that can accommodate an extra portion of an optical fiber. The optical-electrical composite connector further includes a contact portion for electrically contacting with a mating connector, and a dividing member for dividing the housing into a first space and a second space. The optical fiber is disposed in the first space of the housing divided by the dividing member, and at least a part of the optical fiber is bent. At least another part of the optical fiber, which is other than the part accommodated in the first space thereof, is disposed in the second space of the housing divided by the dividing member.

8 Claims, 8 Drawing Sheets

OPTICAL-ELECTRICAL COMPOSITE CONNECTOR

BACKGROUND OF THE INVENTION AND RELATED ART STATEMENT

The present invention relates to an optical-electrical composite connector. In particular, the present invention relates to an optical-electrical composite connector having a housing that can accommodate an extra portion of an optical fiber.

In a conventional optical connector such as a conventional optical-electrical composite connector, when an optical fiber is connected to the conventional optical-electrical composite connector, the optical fiber typically has a sufficient extra portion within the conventional optical-electrical composite connector. Since the optical fiber is formed of a glass fiber, it is not resilient against a bending force. Therefore, when the optical fiber has such an extra portion, it is possible to stably secure the connection between the optical fiber and a connecting device. However, if the extra portion of the optical fiber becomes too long, a wiring design of the conventional optical-electrical composite connector tends to be complicated. Therefore, it is a common practice to cut the extra portion of the optical fiber in a short length. Once the extra portion is cut in short, however, it is difficult to recover a whole length of the optical fiber. For this reason, in order to be flexibly applicable to various actual applications, it is preferred to secure such an extra portion as far as the configuration allows.

When the conventional optical-electrical composite connector has such a configuration, the housing thereof needs to have a certain size. It would be difficult to handle the conventional optical-electrical composite connector if the conventional optical-electrical composite connector has a small housing. Therefore, it is necessary to form the housing of the conventional optical-electrical composite connector to have a certain sise, so that it is possible to secure a space for the extra portion of the optical fiber (refer to Patent Reference).

Patent Reference: Japanese Patent Application Publication No. 2012-88571

Figure 11:
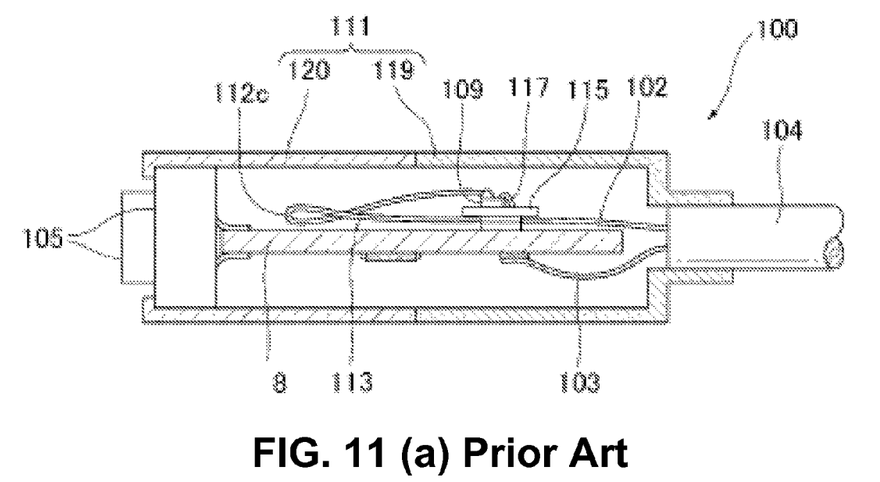
FIG. 11(a) is a schematic side sectional view showing the conventional optical-electrical composite connector.
FIG. 11(b) is a schematic plan sectional view showing the conventional optical-electrical composite connector.

FIGS. 11(a) and 11(b) are schematic views showing an example of a conventional optical-electrical composite connector 100. The conventional optical-electrical composite connector 100 includes a housing that can accommodate an extra portion of an optical fiber. More specifically, FIG. 11(a) is a side sectional view of the conventional optical-electrical composite connector 100. FIG. 11(b) is a top sectional view of the conventional optical-electrical composite connector 100.

As shown in FIGS. 11(a) and 11(b), the conventional optical-electrical composite connector 100 includes a circuit board 108, an auxiliary board 115 provided on the circuit board 108, an optical-electrical converter 109 and a wiring portion 117 provided on the auxiliary board 115, a housing 111 to accommodate the circuit board 108 and other devices provided thereon, and an electric pin 105 for connecting to an external device.

In the conventional optical-electrical composite connector 100, optical fibers 102 are optically connected to the optical-electrical converter 109. The optical fibers 102 are drawn out from an optical cable 104, and have a curved portion 112c in the housing 111. The housing 111 includes a first housing body 119 to accommodate the optical-electrical converter 109, and a second housing body 120. The optical fibers 102 are introduced in the second housing body 120 via the first housing body 119, and are turned at the curved portion 112c and arranged towards the optical-electrical converter 109. Furthermore, the second housing body 120 includes a pair of side flat sections 120d and 120e. The side flat sections 120d and 120e can hold the curved portion 112c in between by pinching the curved portion 112c against an elastic force thereof while the curved portion 112c is being bent.

According to the conventional optical-electrical composite connector 100, the optical fibers 102 have the extra portions 113. The extra portions 113 of the optical fibers 102 are disposed on one side of the circuit board, especially above where the auxiliary board 115, the optical-electrical converters 109, and the wiring portion 117 are provided. The extra portions 113 of the optical fibers 102 are not disposed on the other side of the circuit board 108, i.e., in a relatively large space under where the auxiliary board 115, the optical-electrical converter 109, and the wiring portion 117, the extra portions 113 of the optical fibers 102 are not disposed. It should be noted that a dotted line under the circuit board 108 in FIG. 11(b) indicates wires 103, and does not indicate the optical fibers 102. There is no optical fiber 102 under the circuit board 108, and the lengths of the extra portions 113 are limited.

In view of the problems described above, an object of the present invention is to provide an optical-electrical composite connector that can solve the problems of the conventional optical-electrical composite connector.

According to the present invention, the optical-electrical composite connector includes a housing that, can accommodate the extra portion of the optical fiber without complicating a wiring design thereof. Moreover, in the optical-electrical composite connector of the present invention, it is possible to effectively utilize a space inside the optical-electrical composite connector.

Further objects and advantages of the present invention will be apparent from the following description of the present invention.

SUMMARY OF THE PRESENT INVENTION

According to a first aspect of the present invention, an optical-electrical composite connector includes a housing that can accommodate an extra portion of an optical fiber. The optical-electrical composite connector further includes a contact portion for electrically contacting with a mating connector, and a dividing member for dividing the housing into a first space and a second space. The optical fiber is disposed in the first space of the housing divided by the dividing member, and at least a part of the optical fiber is bent. At least another part of the optical fiber, which is other than the part accommodated in the first space thereof, is disposed in the second space of the housing divided by the dividing member.

According to the first aspect of the present, invention, the optical-electrical composite connector further includes an optical-electrical converter module and a coupling connector. The optical-electrical converter module is connected to one end of the optical fiber. The coupling connector is disposed in the second space relative to the dividing member, and can be connected to the optical-electrical converter module.

According to the first aspect of the present invention, using the dividing member, the housing is clearly divided into the first space and the second space, and thereby it is possible to clearly distinguish between the wiring design and the place to accommodate the optical fiber. Therefore, without complicating the wiring design, it is possible to accommodate the extra portion of the optical fiber. In addition, the optical fiber is connected to the optical-electrical composite connector through the optical-electrical converter module and the electrical connector. Therefore, in comparison with a case where the optical fiber is directly connected to the optical-electrical composite connector, it is possible to easily connect the optical fiber to the optical-electrical composite connector, or assemble the optical-electrical composite connector.

According to a second aspect of the present invention, in the optical-electrical composite connector described above, the dividing member is preferably disposed so as to divide the housing and be arranged in parallel to a surface on which the curved portion of the optical fiber is situated. When the dividing member is arranged in parallel to the surface on which the curved portion of the optical fiber is situated, it is possible to further reduce the space for accommodating the curved portion, and effectively utilise the space inside the housing.

According to a third aspect of the present invention, in the optical-electrical composite connector described above, at least a part of the optical fiber accommodated in the first space and at least another part of the optical fiber accommodated in the second space may be preferably continuous to each other through a gap formed between an inner wall of the housing and an edge of the dividing member.

According to a fourth aspect of the present invention, in the optical-electrical composite connector described above, the gap may be preferably provided on a side other than a fitting side of the optical-electrical composite connector to fit to a mating connector in a dividing direction of the dividing member. When the gap is provided in such a place, it is possible to arrange the optical fiber continuously between the first space and the second space without making it difficult to connect the fitting between the optical-electrical composite connector to the mating connector.

According to a fifth aspect of the present invention, in the optical-electrical composite connector described above, at least a part of the curved portion may be wound around a winding section provided in the first space. When the winding section is provided in the first space, it is possible to easily accommodate the optical fiber.

According to the present invention, it is possible to provide the optical-electrical composite connector having the housing that can accommodate the extra portion of the optical fiber without complicating the wiring design thereof. Moreover, it is also possible to provide the optical-electrical composite connector capable of effectively utilizing the space inside the optical-electrical composite connector.

BRIEF DESCRIPTION OF THE DRAWINGS

FIGS. 2(a) and 2(b) are views showing the optical-electrical composite connector and a mating connector thereof according to the embodiment of the present invention, wherein

FIGS. 11(a) and 11(b) are sectional views showing a conventional optical-electrical composite connector, which has a housing capable of accommodating an extra portion of an optical fiber, wherein

DETAILED DECSRIPTION OF THE PREFERRED EMBODIMENTS

Hereunder, an embodiment of the present invention will be described with reference to the accompanying drawings.

Figure 1:
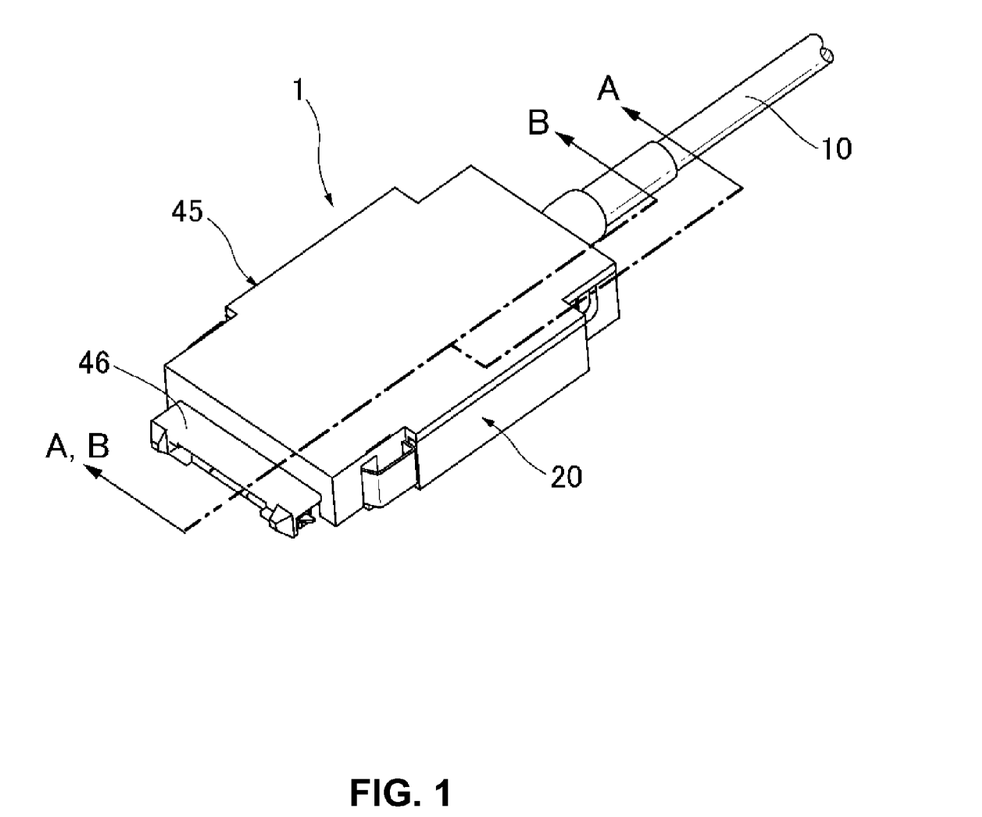
FIG. 1 is a perspective view showing an optical-electrical composite connector in a state that the optical-electrical composite connector is connected to an optical cable according to an embodiment of the present invention.
Figure 2:
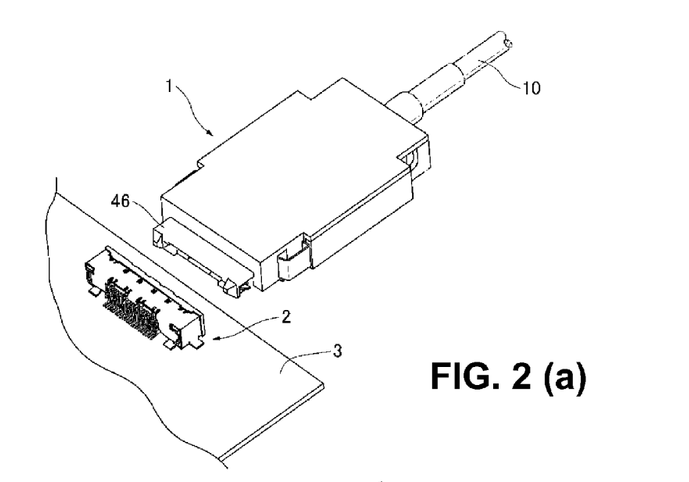
FIG. 2(a) is a perspective view showing the optical-electrical composite connector and the mating connector.
FIG. 2(b) is a sectional view of the optical-electrical composite connector and the mating connector taking along a longitudinal centerline of the optical-electrical composite connector.

FIG. 1 is a perspective view of an optical-electrical composite connector 1 according to the embodiment of the present invention, in which the optical-electrical composite connector 1 is connected to an optical cable. FIGS. 2(a) and 2 (b) are views of the optical-electrical composite connector 1 according to the embodiment of the present invention and a mating connector 2 thereof. More specifically, FIG. 2(a) is a perspective view showing the optical-electrical composite connector 1 and the mating connector 2. FIG. 2(b) is a sectional view of the optical-electrical composite connector 1 and the mating connector 2, taking along a longitudinal centerline of the optical-electrical composite connector 1.

According to the embodiment, the optical-electrical composite connector 1 is used, being secured to one end of an optical cable 10, and can process optical signals. Furthermore, the optical-electrical composite connector 1 is connected to an electrical connector 2. The electrical connector 2 is used, while being disposed on a substrate 3. When the optical-electrical composite connector 1 is connected to the electrical connector 2, a connector fitting section 46 is inserted in a fitting hole 4 of the electrical connector 2 that is disposed upright on the substrate 3. The connector fitting section 46 is provided protruding from a part of a front edge of the optical-electrical composite connector 1. The optical-electrical composite connector 1 converts between optical signals and electrical signals. The optical signals received by the optical-electrical composite connector 1 through the optical cable 10 are converted to electrical signals in the optical-electrical composite connector 1. Thereafter, the electrical signals are transmitted to the electrical connector 2.

Alternatively, the electrical signals received by the optical-electrical composite connector 1 through the electrical connector 2 are converted to optical signals in the optical-electrical composite connector 1, and then are transmitted to the optical cable 10.

Figure 3:
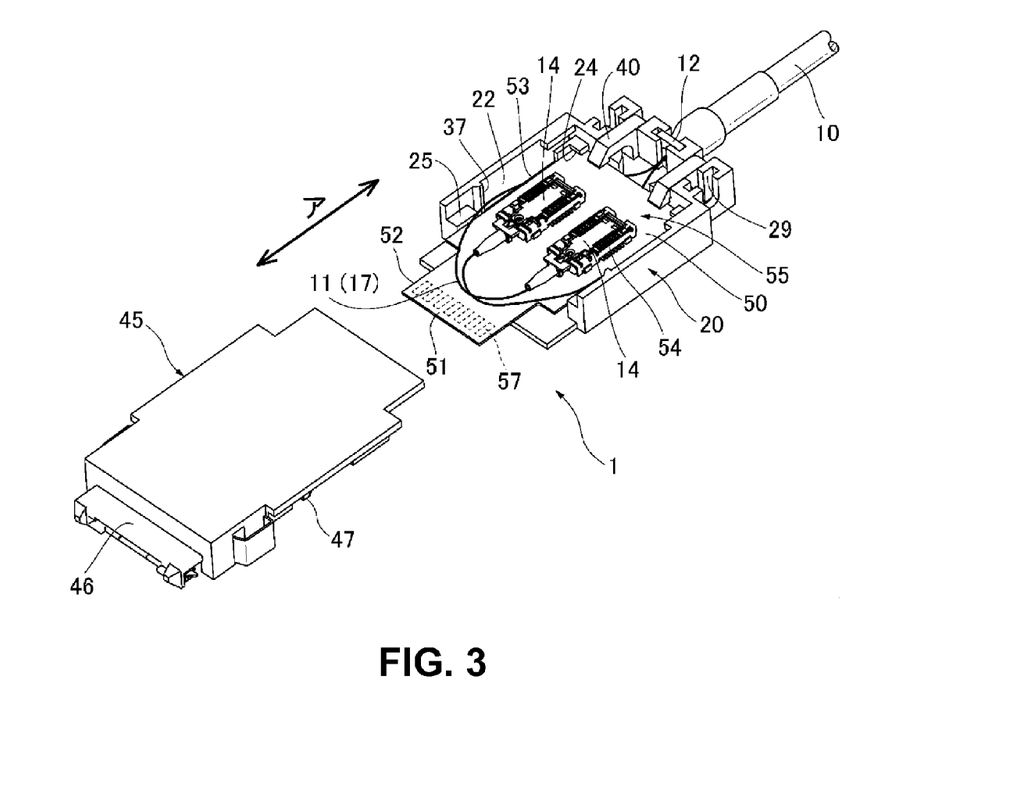
FIG. 3 is a perspective view showing the optical-electrical composite connector in a state that a cover thereof is removed according to the embodiment of the present invention.
Figure 4:
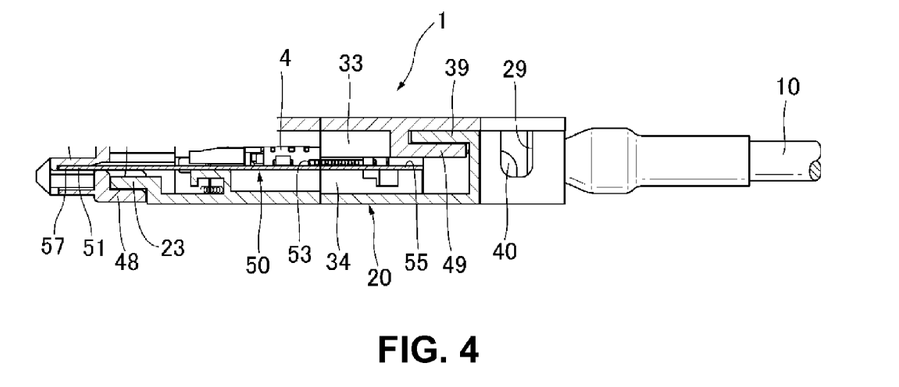
FIG. 4 is a sectional view showing the optical-electrical composite connector taken along a line A-A in FIG. 1 according to the embodiment of the present invention.
Figure 5:
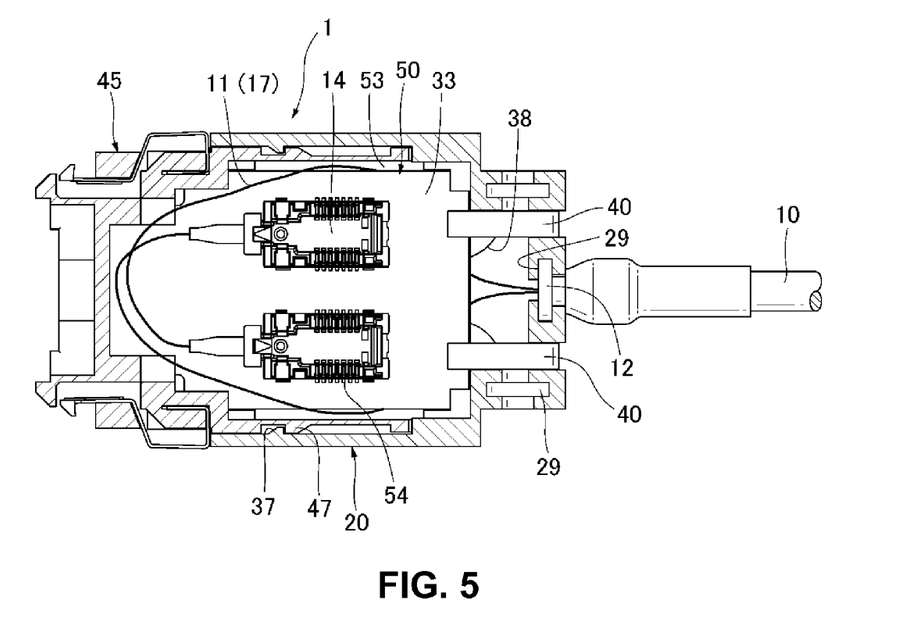
FIG. 5 is a lateral sectional view showing the optical-electrical composite connector according to the embodiment of the present invention.
Figure 6:
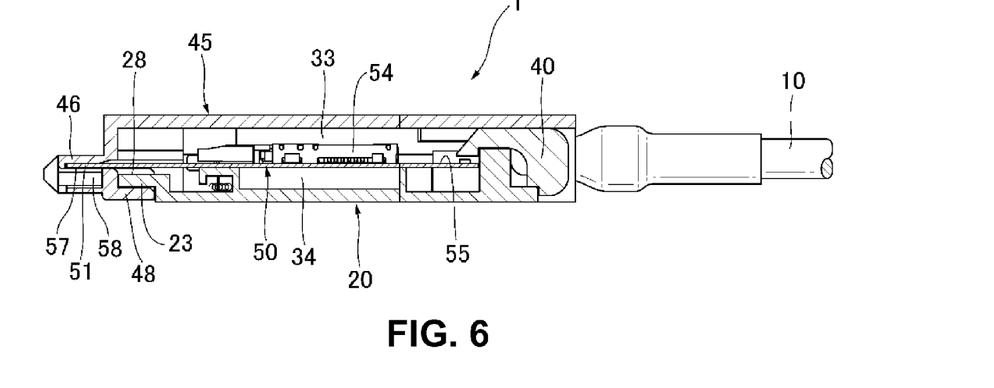
FIG. 6 is a sectional view showing the optical-electrical composite connector taken along a line B-B in FIG. 1 according to the embodiment of the present invention.

FIG. 3 is a perspective view of the optical-electrical composite connector 1 according to the embodiment of the present invention, in which a cover 45 is taken therefrom. FIG. 4 is a sectional view of the optical-electrical composite connector 1 according to the embodiment of the present invention, which is taken along a line A-A of FIG. 1. FIG. 5 is a lateral sectional view of the optical-electrical composite connector 1 according to the embodiment of the present invention. FIG. 6 is a sectional view of the optical-electrical composite connector 1 according to the embodiment of the present invention, which is taken along a line B-B of FIG. 1.

According to the embodiment, the cover 45 can be attached to the housing 20 of the optical-electrical composite connector 1 so as to be freely attached and detached thereto and therefrom, by sliding to the optical-electrical composite connector 1 along a fitting direction (an arrow direction C in FIG. 3). When the cover 45 is attached to the housing 20, a part of the cover 45 can form a part of the connector fitting section 46. In addition, when the cover 45 is slid to the optical-electrical composite connector 1, a front edge 51 of the substrate 50 is inserted in the connector fitting section 46, and positioned on a ceiling-side inner wall of the connector fitting section 46 while leaving housing space 58 thereunder.

According to the embodiment, on a backside (lower surface) of the front edge 51 of the substrate 50, there is arranged a plurality of electric pads 57 (indicated with dotted lines in the figure for convenience) at constant pitch in a row. Those electric pads 57 are provided corresponding to the respective optical fibers 11 of the optical cable 10, and transmit electrical signals that correspond to the optical signals of the optical fibers 11.

According to the embodiment, when the optical-electrical composite connector 1 is fitted to the electrical connector 2 (See FIGS. 2(a) and 2(b)), the connector fitting section 46 of the optical-electrical composite connector 1 is inserted in the fitting hole 4 of the electrical connector 2 (See FIG. 2(b)). Moreover, in the housing space 58 provided in the connector fitting section 46 of the electrical connector 1, a basal section 5 of the electrical connector 2 (See FIG. 2(b)) is accommodated. At this time, the electric pads 57 (contact portions) provided on the lower surface of the front edge 51 of the substrate 50 are electrically connected to the contact points of the corresponding mating terminals 6 provided in the electrical connector 2. As a result, it is possible to electrically communicate between the optical-electrical composite connector 1 and the electrical connector 2 (See FIG. 2).

As shown in FIG. 4, when the cover 45 is attached to the housing 20, a front projection 48 provided on a fitting side of the cover 45 corresponds to a front projection 23 provided on a fitting side of the housing 20. Moreover, a rear projection 49 provided on an optical cable 10 side of the cover 45 corresponds to a rear projection 39 provided on a fitting side of the housing 20. With this configuration, the cover 45 is positioned relative to the housing 20 and closes the accommodating space of the housing 20.

As shown in FIG. 5, there are provided locking protrusions 47 on outer walls of the cover 45 and corresponding locking protrusions 37 on inner walls of the housing 20, so as to be able to lock the cover onto the housing 20. As a result, it is possible to prevent the cover 45 from coming off from the housing 20. Here, in order to be able to confirm signal state in the optical-electrical composite connector 1, it is also possible to provide light guide plates 40 on a rear-edge side of the substrate 50, while being partially visible from outside of the housing 20 as shown in FIG. 6. In addition, it is also possible to configure to emit light to outside through the light guide plate 40, so that it is possible to notify a user a state of signal transmission in the optical-electrical composite connector 1.

According to the embodiment, the space inside the housing 20 is divided into an upper space 33 and a lower space 34 by the substrate 50 provided therein. In the lower space 34, at least a part (a curved portion 15 shown in FIGS. 7 through 10 as will be described below) of the optical fibers 11 taken out from the optical cable 10, i.e., extra portions of the optical fibers 11 are mainly accommodated. On the other hand, in the upper space 33, mainly accommodated are part of the optical fibers other than the part accommodated in the lower space 34 (the curved portion 15) the optical-electrical converter modules 14, and coupling connectors 54 that are secured on the substrate 50 and can be connected to the optical-electrical converter modules 14.

According to the embodiment, inside the housing 20, near a center of the substrate 50 is disposed on upper surfaces of cable hooks 26 of the housing 20. A rear edge part of the substrate 50 is disposed on substrate placing sections 24 of the housing 20. As already described, the front edge 51 of the substrate 50 is inserted and supported in the connector fitting section 46. A position of the substrate 50 in a widthwise direction is restricted by a substrate-positioning protrusions 25 of the housing 20. Furthermore, the front edge 51 of the substrate 50 is inserted in the connector fitting section 46 and placed in, so as to position the substrate 50.

Figure 7:
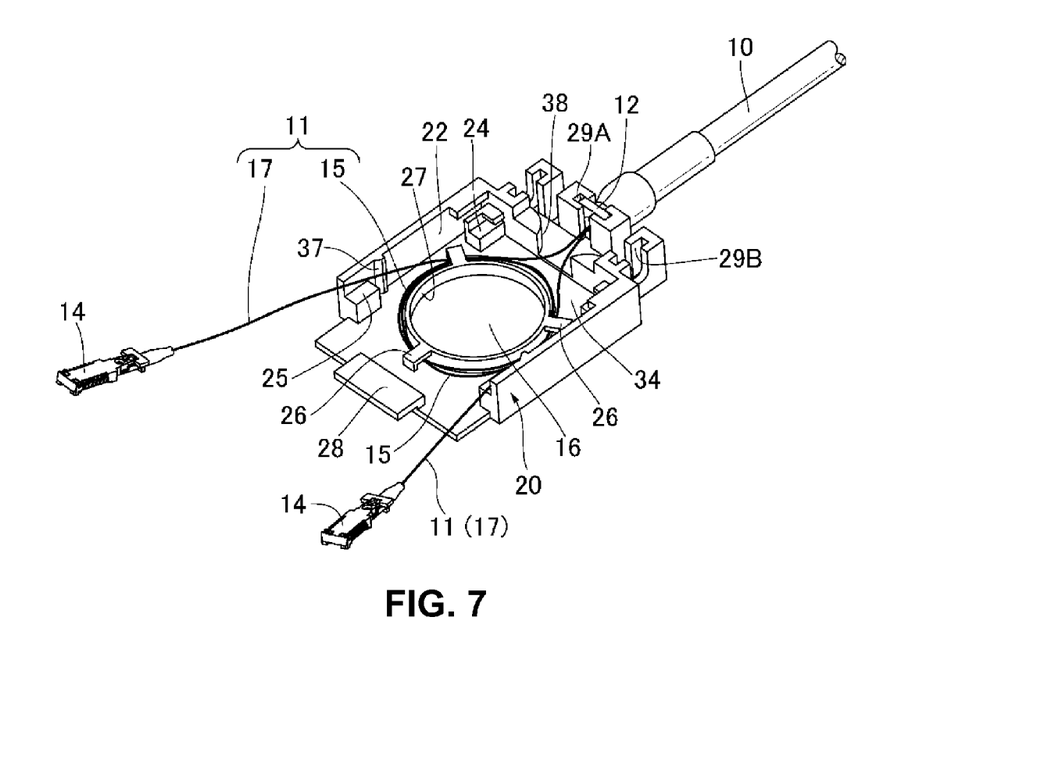
FIG. 7 is a perspective view showing the optical-electrical composite connector in a state that a board thereof is removed according to the embodiment of the present invention.

FIG. 7 is a perspective view of the optical-electrical composite connector 1 of FIG. 3, in which the substrate 50 is further removed therefrom. An outlet to take out the optical fibers 10 is clamped with the fixing metal member 12. The fixing metal member 12 is inserted in the fixing metal member holding section 29, which is provided in the housing 20 and has a generally U-shape in a side view from thereabove. As a result, the fixing metal member 12 can be easily secured in the housing 20.

According to the embodiment, the number of the fixing metal member holding sections 29 does not have to be only one. It is possible to provide a plurality of the fixing metal member holding sections 29 while being capable of selecting from a plurality of points in the housing 20. According to the environment to use, if is possible to select and use the fixing metal member holding sections 29 at appropriate points. Accordingly, if is possible to control the outlet direction of the optical cable 10 and the optical fibers 11 and also possible to make easy the wiring design within the device.

Figure 8:
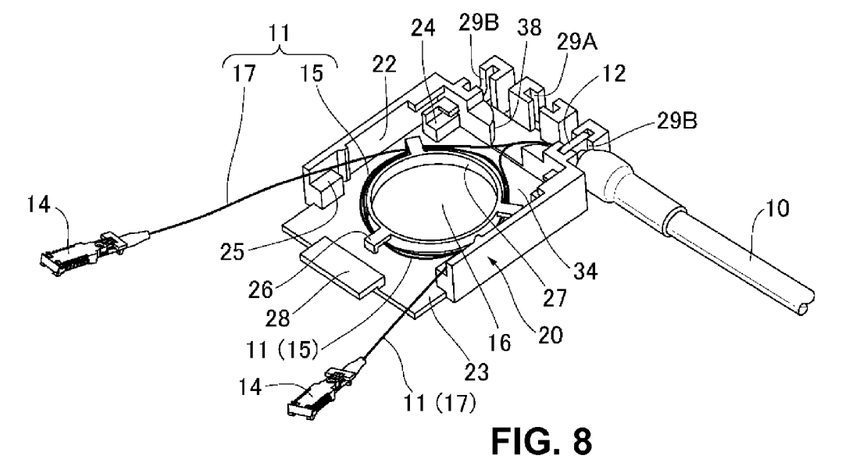
FIG. 8 is a perspective view showing the optical-electrical composite connector in a state that a fixing metal member thereof is secured laterally according to the embodiment of the present invention.

FIG. 8 is a perspective view of the optical-electrical composite connector 1 according to the embodiment of the present invention, in which the fixing metal member 12 is secured laterally. For example, in place of the fixing metal member holding sections 29B provided at the center as shown in FIG. 7, the fixing metal member 12 is attached to a fixing metal member holding section 29B provided on a side surface as shown in FIG. 8 (which is the fixing metal member 29B provided on the right-hand side when viewed from the front). As a result, it is also possible to secure the optical cable 10 and the optical fibers 11 laterally to the housing 20.

As well shown in FIGS. 7 and 8, the optical fibers 11 taken out from the optical cable 10 are guided to the lower space 34 from the inlet 38 provided on a side of the optical cable 10 in the housing 20. In order to smoothly guide the optical fibers 11, a side wall of the inlet 38 preferably is formed to have an R-shape. Especially as shown in FIG. 8, when the fixing metal member 12 is attached using the fixing metal member holding section 29B provided near the side surface, it requires significantly changing the direction of the optical fibers 11, and therefore the optical fibers 11 easily hit the side wall of the inlet 38. Even in this case, as long as the side wall of the inlet 38 is formed in an R-shape, it is possible to smoothly guide the optical fibers 11 to the lower space 34.

According to the embodiment, at least a part of the optical fibers 11 taken out from the optical cable 10 is accommodated in the lower space 34 while being bent. Since the optical fibers 11 are glass fibers, it is impossible to strongly bend, and it requires accommodating the optical fibers 11 while relatively softly curving. Providing the curved portion 15, it is capable of more safely accommodating the optical fibers 11 in the lower space 34 without requiring a large space.

According to the embodiment, in order to make the accommodating work easy, it is also possible to provide a winding section 27 having an annular shape in the lower space 34. Furthermore, around the winding section 27, there is provided a plurality of, e.g., three, generally L-shaped cable hooks 26 that can be also used for disposing the substrate 50 thereon. After being guided in the lower case 34, the optical fibers 11 are wound around the winding section 27 while sufficiently securing a work width for attaching to the coupling connector 54. With the cable hooks 26, the optical fibers are also kept down being suppressed from thereabove.

According to the embodiment, with the winding section 27, it is possible to more simply dispose the curved portion 15 in the lower space 34 in a more compact manner. Moreover, with the cable hooks 26, it is also possible to prevent intruding of the curved portion 15 to the upper space 33. Here, it is also possible to form the curved portion 15 using inner walls 22 of the housing 20, without using the winding section 27 or the cable hooks 26. Here, the curved portion 15 does not always require having a length to be able to wrap around the winding section 27. Needless to say, for example, the curved portion 15 can have a length that just contacts with a part of circumference of the winding section 27.

Figure 9:
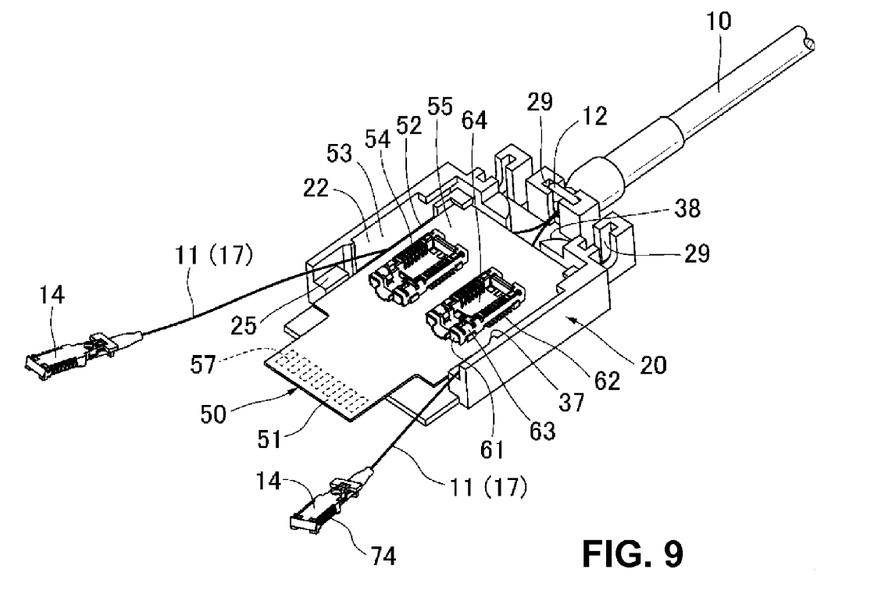
FIG. 9 is a perspective view showing the optical-electrical composite connector for explaining a method of assembling the optical-electrical composite connector according to the embodiment of the present invention.
Figure 10:
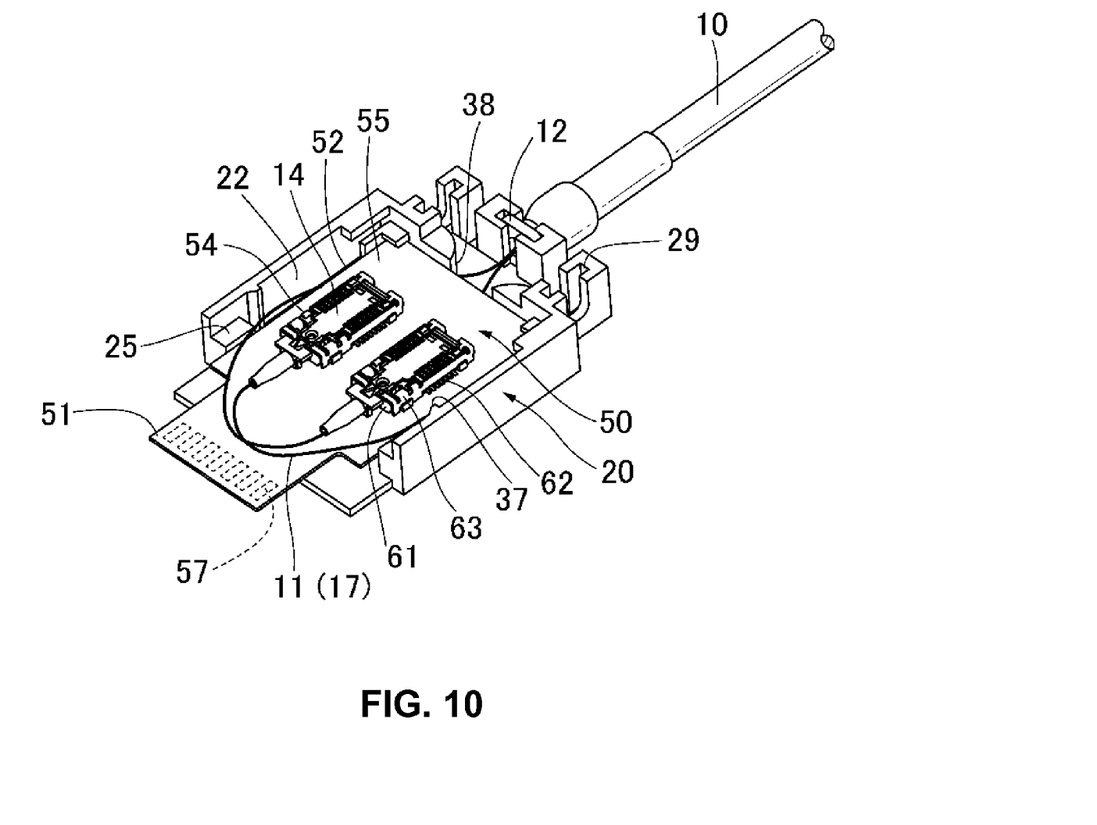
FIG. 10 is a perspective view showing the optical-electrical composite connector for explaining the method of assembling the optical-electrical composite connector according to the embodiment of the present invention.

Referring also to FIGS. 3, 9, and 3 as well as FIGS. 7 and 8, a method of assembling the optical-electrical composite connector 1 will be described. FIG. 9 is a view to explain a method of assembling the optical-electrical composite connector 1 according to the embodiment of the present invention. FIG. 10 is a view to explain a method of assembling the optical-electrical composite connector 1 according to the embodiment of the present invention. FIGS. 9, 10, and 3 show step by step the assembling process of the optical-electrical composite connector 1 after the steps shown in FIGS. 7 and 8.

As shown in FIGS. 7 and 8, after disposing the curved portion 15 of the optical fibers 11 in the housing 20, the substrate 50 is placed above the curved portion 15. With the substrate 50 being disposed, the space inside the housing 20 is divided info the upper space 33 and the lower space 34. As a result, the curved portion 15 is accommodated in the lower space 34.

According to the embodiment, using the substrate 50 in this way, inside of the housing 20 is divided into the upper space 33 and the lower space 34, so as to clearly separate between the wiring design and the part of the optical fibers accommodated therein. Therefore, it is possible to accommodate the extra portions of the optical fibers without complicating the wiring design. Moreover, directing the substrate 50 be in parallel to a surface 16 for forming the curved portion 15 of the optical fibers 11, it is possible to make the space for accommodating the curved portion 15 even smaller and thereby possible to effectively use the space inside the housing 20.

As shown in FIG. 9, even after dividing the housing 20 into the upper space 33 and the lower space 34 with the substrate 50, the curved portion 15 of the optical fibers 11, which is accommodated in the lower space 34, and the part 17 of the optical fibers 11, which is accommodated in the upper space 33, are connected through gaps 53 formed between the inner walls 22 of the housing 20 and the edges 52 of the sabstrate 50.

According to the embodiment, the gaps 53 are provided on sides other than a fitting side for fitting the optical-electrical composite connector 1 to the mating connector 2 (on a front edge side of the optical-electrical composite connector 1), e.g., a side along the fitting direction. When the gaps are provided on the fitting side of the optical-electrical composite connector 1 to fit to the mating connector (on the front edge side of the optical-electrical composite connector 1), the space inside the housing 20 on the fitting side of the optical-electrical composite connector 1 to fit to the mating connector 2 is taken by the optical fibers 11. Therefore, in this case, there is a problem in fitting. Furthermore, in order to avoid the problem, it requires increasing the size of the optical-electrical composite connector 1.

As shown in FIG. 9, the gaps 53 are provided on the sides other than the fitting side of the optical-electrical composite connector 1 to fit to the mating connector 2. Therefore, without disturbing the fitting of the optical-electrical composite connector 1 to the mating connector 2, it is possible to easily keep the continuous state of the optical fibers 11 between the upper space 33 and the lower space 34. Here, it is preferred to provide the gaps on the fitting side, but if the optical fibers do not reach the front edge 51 of the substrate 50 to be inserted in the connector fitting section 46, it is also possible to provide the gap on the fitting side.

Thereafter as shown in FIG. 10, the optical fibers 11 taken out from the gaps 53 are connected to the coupling connectors 54 on the substrate 50, using the optical-electrical converter modules 14 connected to one ends of the optical fibers 11, while having the optical fibers 11 being largely curved so as to draw half circles. The optical-electrical converter modules 14 convert between optical signals and electrical signals. The optical-electrical converter modules 14 are fitted in the concave fitting sections 64 of the coupling connectors 54 and electrically connected. Even when the optical-electrical converter modules 14 are fitted in the fitting section 64, the optical-electrical converter modules 14 are not secured therein, and still can be detached and attached therefrom and therein freely.

According to the embodiment, when the optical-electrical converter modules 14 are equipped with various optical-electrical replacement components, the optical-electrical converter modules 14 can have both electric-optical converting function (can be also understood as transmitting function) and optical-electric converting function (can be also understood as receiving function). For example, when the coupling connectors 54 are fitted in the optical-electrical converter modules 14, the optical-electrical converter modules 14 can convert optical signals, which are transmitted through the optical cable 10, to electric signals with the optical-electrical converting components provided in the optical-electrical converter modules, and transmit to the coupling connectors 54 and the substrate 50. Alternatively, the optical-electrical converting components convert electric signals transmitted through the substrate 50 to optical signals and transmit to the optical cable 10.

According to the embodiment, although the coupling connectors 54 have somewhat different shapes from the one described above, taut have identical functions to those of ordinary electrical connectors. Each of the coupling connectors 54 mainly includes a frame-like receptacle housing 61, a plurality of terminals 62 disposed in the receptacle housing 61, and a shell 63 that covers outside of the housing 61. The receptacle housing 61 is formed in a frame-like shape, and forms a fitting section (See FIG. 9) to fit the optical-electrical converter module 14. The receptacle terminals 62 are pressed and secured in the receptacle housing 61, and a part thereof protrudes to the fitting section 64. When the optical-electrical converter modules 14 are fitted in the fitting sections 64, the receptacle terminals 62 are electrically connected to corresponding terminals 74 of the optical-electrical converter modules 14.

Lastly, as shown in FIG. 3, sliding the cover 45 to the housing 20 so as to attach thereto, assembling of the optical-electrical composite connector 1 is completed.

According to the embodiment, the electric pads 57 provided on the substrate 50 are not necessarily directly connected to the mating electrical connector 2. The electric pads 57 can be electrically connected to the mating electrical connector 2 via other electrical connectors mounted on the electrical pads that are provided as fitting sections.

As described above, the present invention is widely applicable to the optical-electrical composite connector that may be used for connecting to the optical cable.

The disclosure of Japanese Patent Application No. 2013-177666, filed on Aug. 29, 2013, is incorporated in the application by reference.

While the present invention has been explained with reference to the specific embodiments of the present invention, the explanation is illustrative and the present invention is limited only by the appended claims.

What is claimed is:

1. An optical-electrical composite connector to be connected to an optical fiber and a mating connector, comprising:
   a housing for accommodating the optical fiber;
   a contact portion for electrically contacting with the mating connector;
   a dividing member for dividing the housing into a first space and a second space so that at least a part of the optical fiber is disposed in the first space in a curved state, and a remaining part of the optical fiber is disposed in the second space;
   an optical-electrical converter module disposed on the dividing member and to be connected to the optical fiber; and
   a coupling connector disposed on the dividing member and connected to the optical-electrical converter module.

2. The optical-electrical composite connector according to claim 1, wherein said dividing member is arranged in parallel to a plane on which the part of the optical fiber is situated.

3. The optical-electrical composite connector according to claim 1, wherein said dividing member is arranged away from a side inner surface of the housing so that the optical fiber passes through a gap between the dividing member and the side inner surface.

4. The optical-electrical composite connector according to claim 3, wherein said dividing member is arranged so that the gap is situated at a location other than a fitting side of the optical-electrical composite connector relative to the mating connector.

5. The optical-electrical composite connector according to claim 1, further comprising a winding portion disposed in the first space so that the part of the optical fiber is wound around the winding portion.

6. The optical-electrical composite connector according to claim 1, wherein said housing includes an inlet for receiving the optical fiber, and
   said inlet is disposed at an end of the housing opposite to the contact portion.

7. The optical-electrical composite connector according to claim 1, wherein said inlet is communicated with the first space, and
   said optical-electrical converter module and said coupling connector are situated in the second space.

8. The optical-electrical composite connector according to claim 1, wherein said coupling connector includes a recessed fitting section so that the optical-electrical converter module is fitted in the recessed fitting section.

* * * * *